United States Patent
Gamble et al.

(10) Patent No.: US 7,106,094 B2
(45) Date of Patent: Sep. 12, 2006

(54) METHOD AND TOPOLOGY FOR IMPROVING SIGNAL QUALITY ON HIGH SPEED, MULTI-DROP BUSSES

(75) Inventors: Edmund S. Gamble, Austin, TX (US); Terence Rodrigues, Austin, TX (US); Leon Wu, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 77 days.

(21) Appl. No.: 10/845,897

(22) Filed: May 14, 2004

(65) Prior Publication Data
US 2005/0253621 A1    Nov. 17, 2005

(51) Int. Cl.
H03K 17/16    (2006.01)
H03K 19/003   (2006.01)

(52) U.S. Cl. .............................. 326/30; 326/26; 326/27
(58) Field of Classification Search ................... 326/30, 326/26–27, 83
See application file for complete search history.

(56) References Cited

U.S. PATENT DOCUMENTS

| | | | |
|---|---|---|---|
| 4,506,365 A * | 3/1985 | Collins ........................ | 714/766 |
| 4,710,724 A * | 12/1987 | Connell et al. ................. | 330/9 |
| 5,287,022 A | 2/1994 | Wilsher | |
| 5,432,913 A | 7/1995 | Smits et al. | |
| 5,436,846 A | 7/1995 | Fleming-Dahl | |
| 5,467,456 A * | 11/1995 | Moxley et al. ................ | 716/15 |
| 5,485,107 A * | 1/1996 | Lacey et al. ................... | 326/86 |
| 5,655,108 A | 8/1997 | Uchiyama | |
| 5,757,654 A | 5/1998 | Appel | |
| 6,177,807 B1 | 1/2001 | Bertin et al. | |
| 6,297,663 B1 * | 10/2001 | Matsuoka et al. ............. | 326/30 |
| 6,308,232 B1 * | 10/2001 | Gasbarro ..................... | 710/100 |
| 6,411,121 B1 | 6/2002 | Culler | |
| 6,493,394 B1 * | 12/2002 | Tamura et al. ............... | 375/257 |
| 6,842,393 B1 * | 1/2005 | Ryan et al. ............. | 365/230.03 |

FOREIGN PATENT DOCUMENTS

JP    5288794 A    11/1993
JP    2002-063225    2/2002

OTHER PUBLICATIONS

IBM Technical Disclosure Bulletin, *Reduction of Write Noise in Memories*, W. Anacker, vol. 8, No. 11, Apr. 1966, pp. 1600-1602.

* cited by examiner

*Primary Examiner*—Rexford Barnie
*Assistant Examiner*—Jason Crawford
(74) *Attorney, Agent, or Firm*—Sawyer Law Group LLP

(57) ABSTRACT

Aspects for improving signal quality on high speed, multi-drop busses are described. The aspects include coupling a source device directly to multiple load devices, wherein there are no resistance components coupled in series between the source device and the multiple load devices. The aspects further include providing a spacing arrangement for the multiple load devices, wherein negative reflections are delayed to minimize deleterious efforts from the negative reflections. Through the present invention, the modified version of a commonly used bus topology achieves extended voltage timing margins in a high speed, multi-drop bus in a straightforward and efficient manner.

16 Claims, 1 Drawing Sheet

METHOD AND TOPOLOGY FOR IMPROVING SIGNAL QUALITY ON HIGH SPEED, MULTI-DROP BUSSES

FIELD OF THE INVENTION

The present invention relates to a topology for high speed transmission lines with multiple devices.

BACKGROUND OF THE INVENTION

With the increasingly small size of computer systems and the limited number of signal lines available on a chip, there is demand that multiple devices reside on a single bus. Thus, high speed, multi-drop busses are in widespread use today. This is particularly evident in memory sub-systems, where multiple DIMMs (dual in-line memory modules) reside on a single bus and communicate with a memory controller. In order to ensure reliable, fast transmission of data between the devices, the busses use various transmission line topologies and termination techniques to ensure adequate signal quality.

With multiple DRAM (dynamic random access memory) load devices coupled to a common bus line and driver, negative reflections appear on the bus due to the highly capactive nature of the load devices. Further negative reflections can result from a mismatch between the characteristic impedance of the transmission line and the termination resistor, Rtt, of the transmission line. If not properly handled, these negative reflections result in deleterious effects on signal quality, e.g., loss of available timing margin and/or inadequate voltage margin.

A common technique to handle this problem is to employ a modified version of a daisy-chain bus topology. FIG. 1 illustrates a common bus topology for this purpose. A controller 10 is located at one end of the bus, while DRAM load devices 12, 14, 16 and 18 are situated at uniform intervals, L, along the bus. The bus is terminated at the other end by means of a short trace connecting the last load 18 to Vtt (termination voltage) through the termination resistor Rtt. Vtt is also the reference voltage of the receiver, so that its voltage level is chosen to be half of Vdd (voltage supply of the DRAMs). In order to ensure an adequate DC swing for the receiver, while still maintaining a reasonable size for the driver, the value of Rtt is usually smaller than the characteristic impedance (Zo) of the transmission line.

In general, the equation relating the reflection component $V1^-$ generated by an incident waveform $V1^+$ impinging upon a component or device is given by: $V1^-(t)=\rho(t)V1^+$, where $\rho(t)$ is an exponential function with a time constant determined by the capacitance value and the impedance in series with it. If $\rho(t)$ takes negative values, the reflected wavefront is also negative, and its maximum amplitude is proportional to the value of $V1^+$ max. A negative value of $\rho(t)$, which gives rise to negative reflections, can occur from a mismatched termination, such that Rtt<Zo, and $\rho(t)$ is a constant negative. A negative value can also occur from a capacitive load across which the voltage changes, such that $\rho(t)$ varies monotonically from −1 to +1 during the period of voltage changing.

The reflections produced travel back down the line towards the driver, and because they are negative, they cause the voltage at the devices they encounter to have a sharp negative trough, acting in the opposite direction to the incident waveform. Such action in the opposite direction causes the voltage waveform at a device to be non-monotonic in the transition region, which results in false switching.

Moreover, if the trace joining the last load 18 to Rtt is short, the negative reflections generated by these two sources of mismatch overlap to produce a much larger negative trough than is produced by each source individually. In this case, even if the voltage waveform has passed through the transition region, the magnitude of the negative reflection may be sufficiently large enough to cause the waveform to ringback below the DC or AC threshold, resulting in false switching or loss of timing margin.

The device most affected is the one closest to the driver (load 12 in FIG. 1). This first device encounters the cumulative effects of the negative voltage reflections produced by the incident wavefront as it passes by all of the remaining devices. A series resistor Rs close to the driver sometimes is used to mitigate this effect. The series resistor reduces the amplitude of $V1^+$, which results in a reduced value of $V1^-$, engendered by both the mismatched termination, as well as the charging (or discharging) capacitor.

While this approach is ubiquitous and has had successful use in certain designs, it has disadvantages. It relies on a trade-off in performance by giving up a fast incident voltage swing (and thus a fast switching time and timing margin) in return for a guarantee of stability (i.e., no non-monotonicity in the transition region.) The series resistance also reduces the steady-state voltage present on the line after the switching, resulting in a loss of steady-state voltage margin.

Accordingly, a need exists for a bus topology for high speed multi-drop, highly capacitive transmission line environments that ensures adequate signal quality. The present invention addresses such a need.

SUMMARY

Aspects for improving signal quality on high speed, multi-drop busses are described. The aspects include coupling a source device directly to multiple load devices, wherein there are no resistance components coupled in series between the source device and the multiple load devices. The aspects further include providing a spacing arrangement for the multiple load devices, wherein negative reflections are delayed to minimize deleterious efforts from the negative reflections. Through the present invention, the modified version of a commonly used bus topology achieves extended voltage timing margins in a high speed, multi-drop bus in a straightforward and efficient manner.

DETAILED DESCRIPTION OF THE INVENTION

The present invention relates to a topology for high speed transmission lines with multiple devices. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
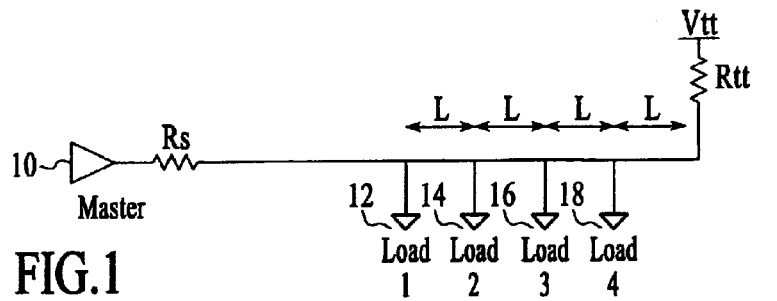
FIG. 1 illustrates a common bus topology for high speed transmission lines.

The present invention modifies the common topology of FIG. 1, including the elimination of the series resistance, so that, although the magnitude of the individual negative reflections from the capacitive loads and the termination resistor is not affected, the arrival of the negative reflections at the prior loads is delayed sufficiently to give a signal waveform a chance to swing well past the transition region of the topology. In addition, the individual negative reflections are spaced apart in time, so that they do not act in conjunction with each other to amplify their deleterious effects.

Figure 2:
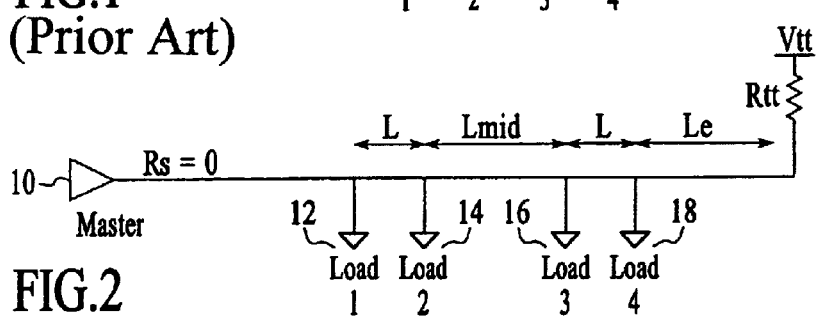
FIG. 2 illustrates a bus topology for high speed transmission lines in accordance with the present invention.

FIG. 2 illustrates a bus topology in accordance with the present invention, where like elements with FIG. 1 have been numbered similarly. As shown in the topology of FIG. 2, the series resistance Rs is no longer present, which increases the incident voltage swing. In order to avoid any potential increase in the negative voltage reflections from the increased incident voltage swing, other modifications to the common topology are made. One change is the grouping of the loads together, where, instead of having the uniform spacing L between all the load elements, each load group is separated from the next group by a distance Lmid (as obtained from simulation for a particular design), while the individual load elements within each group remain at the original spacing distance L. By way of example, pairs of load devices have been found to work well for the groups. Further, the stub joining the last load device of the last group to the termination resistance of the termination network is increased to a distance Le (also determined from simulation, as is well understood in the art). For example, a distance of L=12.7 millimeters (mm) (0.5 inches), Lmid=50.8 mm (2 inches), and Le=50.8 mm, has been found by the inventors to provide highly satisfactory results in the x455 Xseries platform, IBM Corporation, for a memory bus with multiple slave DIMMs.

By eliminating the series resistance, the amplitude of the incident wavefront is increased, which results in increased swing and thus, better timing margin. The wider distance between the DRAM load groups (Lmid instead of L) ensures that the negative reflections coming from devices that are farther down the chain are delayed, so that the voltage at any load point has a chance to swing far beyond the transition region, making it relatively immune to those negative reflections. Using a longer stub (Le) to connect the last load pair to the termination resistance ensures that the negative reflections from the load pair do not overlap with the negative reflection from the termination resistance. By spacing the individual negative reflections apart, their cumulative effect is minimized.

Figure 3:
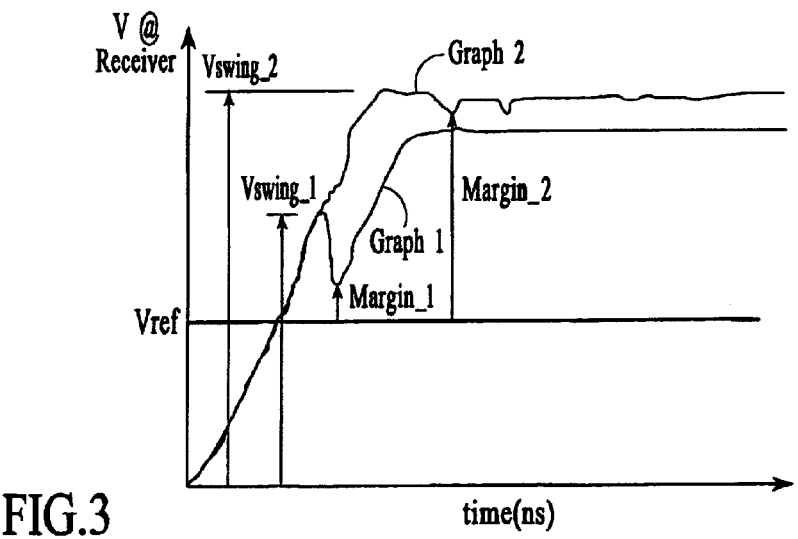
FIG. 3 illustrates a graph demonstrating the effectiveness of the present invention.

FIG. 3 demonstrates the effectiveness of the present invention, where graph 1 shows the waveform encountered when using the original topology of FIG. 1, and graph 2 shows the waveform obtained with the topology of the present invention. Note the single large trough seen on the rising edge of the waveform of graph 1, which reduces the available voltage margin to a value Margin_1. The initial voltage swing is also restricted to a value of Vswing_1 by the series resistor.

Referring to graph 2, note the presence of two smaller troughs separated from each other. Consequently, the improved voltage margin Margin_2 is seen. Further, the voltage swing Vswing_2 is also found to be a much improved value, resulting in better timing margins.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for improving signal quality on a bus system, the method comprising:

coupling a source device directly to multiple load devices, wherein there are no resistance components coupled in series between the source device and the multiple load devices;

providing a spacing arrangement for the multiple load devices, wherein negative reflections are delayed to minimize deleterious efforts from the negative reflections, and wherein the spacing arrangement providing further comprises forming groups of load devices; and utilizing a first distance for spacing between each group of load devices and utilizing a second distance for spacing between each load device with each group.

2. The method of claim 1 wherein the forming groups step further comprises grouping the load devices as pairs.

3. The method of claim 1 further comprising providing a distance between a last load device and a termination resistance; wherein the negative reflections from the last load device do not overlap with the negative reflections from the termination resistance.

4. The method of claim 1 further comprising utilizing the spacing arrangement for dynamic random access memory load devices coupled to a memory controller.

5. A bus system comprising:

a source device; and a plurality of load devices coupled directly to the source device to ensure a large incident voltage swing, wherein there are no resistance components coupled in series between the source device and the multiple load devices, the plurality of load devices having a spacing arrangement that results in delayed negative reflections on the transmission line to minimize deleterious effects from the negative reflections, wherein the plurality of load devices further comprise groups of load devices, and wherein the groups of load devices are separated by a first distance and the load devices within each group are separated by a second distance.

6. The bus system of claim 5 wherein the groups of load devices further comprise pairs of load devices.

7. The bus system of claim 5 wherein a last load device is separated from a termination resistance by a third distance.

8. The bus system of claim 5 wherein a source device further comprises a memory controller.

9. The bus system of claim 8 wherein a plurality of load devices further comprises a plurality of dynamic random access memory devices.

10. A method for improving signal quality on a bus system, the method comprising:

ensuring a large incident voltage swing by directly coupling a source device to a plurality of load devices on a transmission line, wherein there are no resistance components coupled in series between the source device and the plurality of load devices;

delaying negative reflections on the high speed transmission line by spacing the plurality of load devices as arrangements of multiple groups, wherein delaying further comprises spacing the plurality of load devices as arrangements of multiple pairs of load devices; and utilizing a first distance of spacing between the multiple groups and utilizing a second distance between the load devices within each group.

11. The method of claim 10 further comprising utilizing a third distance of spacing between a last load device and a termination resistance on the high speed transmission line.

12. The method of claim 10 further comprising providing a memory controller as the source device and dynamic random access memories as the plurality of load devices.

13. A memory subsystem comprising:
a memory controller; and
a plurality of memory devices coupled directly to the memory controller to ensure a large incident voltage swing, wherein there are no resistance components coupled in series between the source device and the multiple memory devices, the plurality of memory devices having a spacing arrangement that results in delayed negative reflections on the transmission line to minimize deleterious effects from the negative reflections, wherein the plurality of memory devices further comprise groups of memory devices, and wherein the groups of memory devices are separated by a first distance and the memory devices within each group are separated by a second distance.

14. The memory subsystem of claim 13 wherein the groups of memory devices further comprise pairs of memory devices.

15. The memory subsystem of claim 13 wherein a last memory device is separated from a termination resistance by a third distance.

16. The memory subsystem of claim 13 wherein a plurality of memory devices further comprises a plurality of dynamic random access memory devices.

* * * * *